Figure 1:
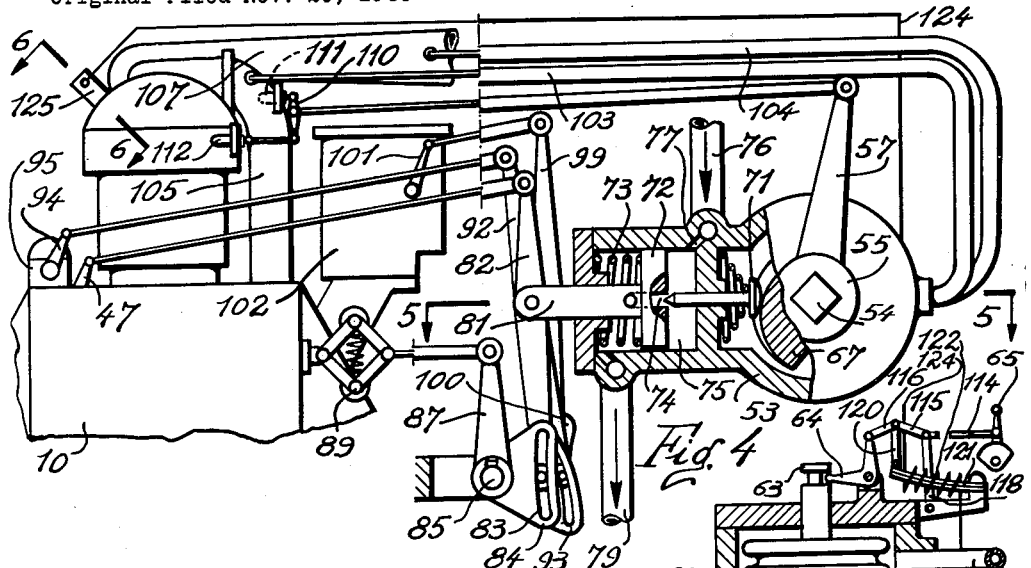

April 9, 1963    F. C. REGGIO    3,084,746
ENGINE SPEED AND FUEL-AIR RATIO CONTROLLER
Original Filed Nov. 20, 1944    2 Sheets-Sheet 1

Inventor
F. C. Reggio

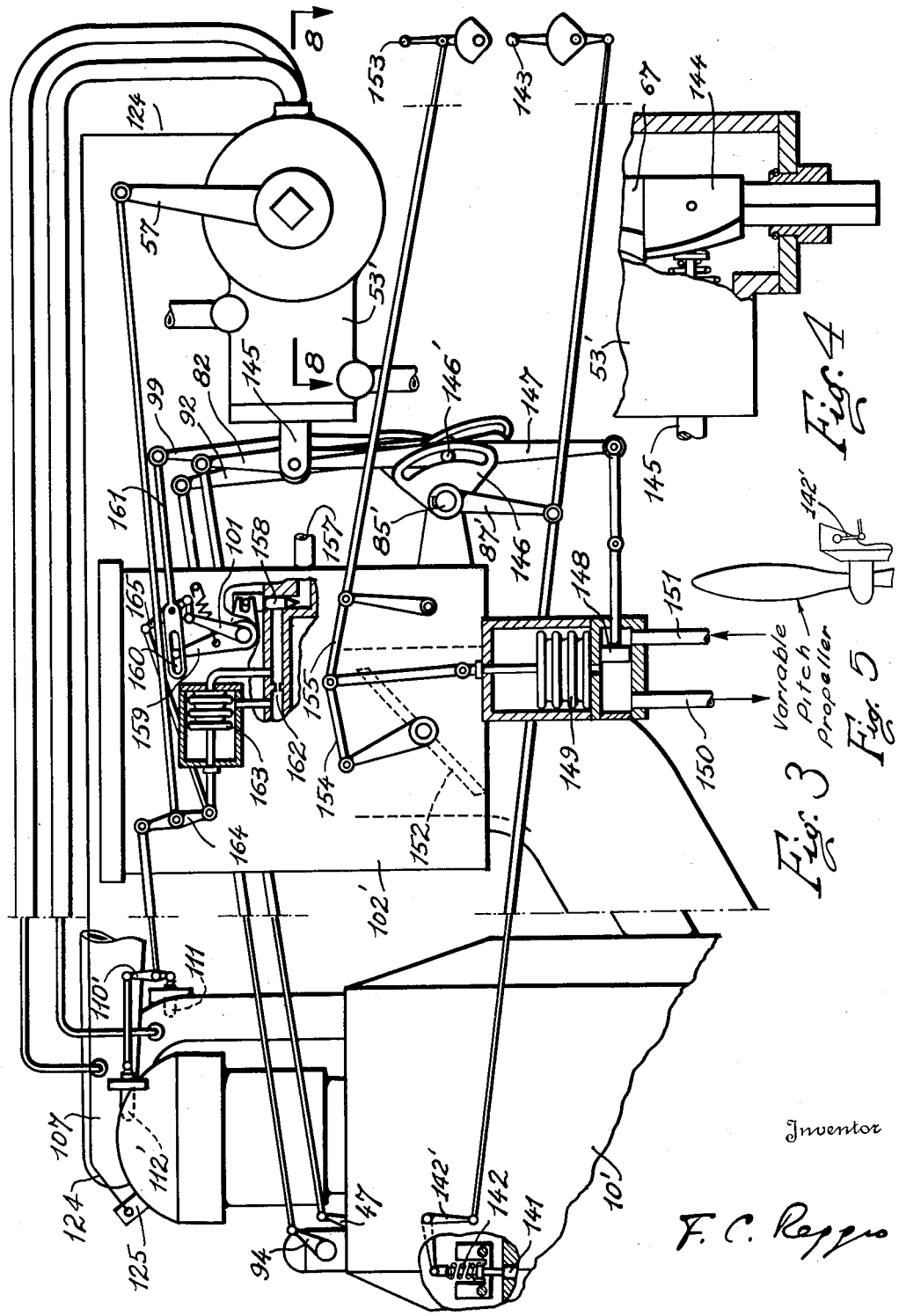

United States Patent Office 3,084,746
Patented Apr. 9, 1963

3,084,746
ENGINE SPEED AND FUEL-AIR
RATIO CONTROLLER
Ferdinando Carlo Reggio, Tampa, Fla.
(P.O. Box 692, Norwalk, Conn.)
Application Feb. 9, 1954, Ser. No. 409,063, which is a division of application Ser. No. 564,379, Nov. 20, 1944, now Patent No. 2,670,724, dated Mar. 2, 1954. Divided and this application July 27, 1959, Ser. No. 829,612
6 Claims. (Cl. 170—135.74)

This invention relates to engine fuel regulating systems, and more particularly to mechanisms for automatically controlling the engine fuel-air ratio as a predetermined function of various engine operating conditions. The invention is particularly useful in connection with aircraft engines driving variable-pitch propellers and other similar engines operating under varying conditions of altitude, temperature, power and speed.

The present application is a division of my application Serial No. 409,063 filed February 9, 1954, now abandoned, which is in turn a division of my application Serial No. 564,379 filed November 20, 1944, now Patent No. 2,670,-724 issued March 2, 1954.

Aircraft propulsion engines designed to operate under wide variations of altitude, temperature, speed and load conditions, are very sensitive to the combustible mixture which is supplied thereto, and in order to obtain satisfactory performance, it is necessary constantly to maintain the engine fuel-air ratio at the optimum value. This optimum fuel-air ratio, of course, is not constant, but varies as the engine operating conditions change. Altitude, temperature, speed and load affect this mixture. Thus it is a primary object of this invention to provide a fuel-air ratio control device which changes the fuel-air proportions automatically, rapidly and accurately as a function of certain selected parameters without requiring any attention on the part of the pilot.

Another object is to provide an automatic fuel-air ratio control which supplies to the engine the proper fuel-air mixture at all speeds, temperatures, altitudes and thrust, so that when the pilot requests a change in power, the control device takes over and schedules the fuel-air proportions automatically, interpreting the pilot's request for changes in power and making the proper compensations for all combinations of operating pressures and temperatures.

A further object is to provide a control system which senses the pilot's power requirements and makes rapid and accurate adjustments in the engine fuel-air ratio for variations in altitude, pressure and temperature.

A still further object is to provide an advanced fuel-air ratio control device for propulsion engines driving a variable pitch propeller and including a three dimensional cam which is so contoured that it can adapt itself to all combinations of induction air temperature and pressure. The control device may be readily adapted to engines having different operating characteristics by changing the configuration of the three dimensional cam.

Other objects and advantages will be more particularly pointed out hereinafter or will become apparent as the description proceeds.

In the accompanying drawings there are illustrated certain examples of embodiment for the purpose of disclosing the invention. The drawings, however, are for the purpose of illustration only and are not to be taken as limiting or restricting the invention since it will be apparent to those skilled in the art that various changes in the illustrated constructions may be restored to without departing from the scope of this novel concept.

Figure 2:
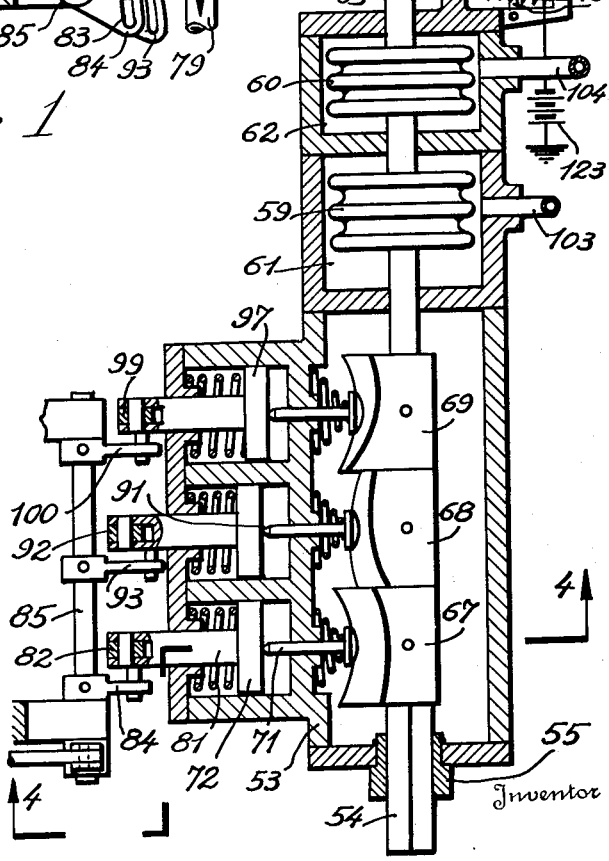

In the drawings, FIGURE 1 shows in side elevation an example of engine control system embodying the invention, and FIGURE 2 is a section taken along the line 5—5 of FIGURE 1. FIGURE 3 shows in side elevation another example of embodiment of regulating system according to the invention. FIGURE 4 is a fragmentary section taken along the line 8—8 of FIGURE 3, and FIGURE 5 shows a variable-pitch propeller which may be used in connection with the structure of FIGURE 3.

Referring to the drawings in detail, the numeral 10 indicates an engine, shown in reduced scale as a conventional radial aircraft engine, and a preferred embodiment of control system therefor according to the invention. This includes a regulator having a housing 53 and a shaft 54 therein, formed with a non-circular or splined end slidable in a sleeve 55 which is rotatably mounted in the cover of housing 53 and is provided with a lever 57 which serves to control the angular adjustment of the shaft. This shaft 54 is connected with two expansible pressure responsive bellows 59 and 60 which are coaxial therewith and enclosed within sealed housing 61 and 62, respectively. The far end of the latter bellows is secured to a shaft element 63 which extends through a bore formed in the cover of the housing 62 and which is provided with an annular groove engaged by one end of a bellcrank lever 64 linked to a remote control member such as a pilot's lever 65. Three warped or three-dimensional cams 67, 68 and 69 are secured to the shaft 54, and the whole shaft assembly including cams, bellows and element 63 are rotatable with lever 57, while the axial adjustment of the shaft 54 and of the three warped cams is dependent upon the setting of the pilot's lever 65 and the pressure within the bellows housings 61 and 62.

The slidable and rotatable warped cam 67 actuates a spring loaded needle valve 71 slidably mounted in the end wall of a hydraulic cylinder including a power piston 72 loaded by a spring 73, provided with a discharge conduit 74 coaxial with the valve 71, and actuated by the pressure oil in chamber 75. Oil is admitted to chamber 75 from a high pressure oil line 76 through a calibrated orifice 77, and is drained therefrom through the conduit 74 whose effective open area is dependent upon the relative axial adjustment of the needle valve 71 and power piston 72; and through the low pressure return on line 79. In steady state operation the force exerted by the compression spring 73 against the piston 72 is balanced by the pressure of the oil or hydraulic fluid in the cylinder chamber 75, which pressure has an intermediate value between the high pressure fluid in line 76 and the low pressure fluid in the drain line 79. If now the cam 67 is moved so as to shift the cam follower 71 to the left, the needle valve decreases the effective area of the discharge orifice 74 while the admission orifice 77 remains unchanged, the oil pressure in the chamber 75 rises, and the power piston 72 moves to the left. Conversely, if the cam 67 is moved in a direction to shift the needle valve 71 to the right, the discharge orifice 74 increases, the oil pressure in the cylinder chamber 75 drops, and the piston 72 moves to the right. In either case, the power piston 72 quickly and accurately follows any movement of the cam follower 71.

The power piston 72 is provided with a rod 81 connected with an intermediate point of a floating lever 82 whose lower end carries a pin engaging a slot 83 formed in a cam 84 secured to a shaft 85. The angular adjustment of this shaft is controlled by a lever 87 actuated by centrifugal flyballs 89 driven from the engine 10 and is therefore dependent upon the engine speed. The upper end of lever 82 is connected with a lever 47 mounted on the engine 10. This lever 47 is part of a mechanism which is embodied in the engine and serves to vary the compression ratio of the engine cylinders. Clockwise or counter-clockwise rotation of this lever 47 causes the cylinder compression ratio to increase or decrease, respectively. This compression ratio control device is no part of the present invention, and is not material to an understanding of the present invention, but is disclosed in detail in my copending application Serial No. 409,063 mentioned above.

A second power piston 91, similar to piston 72, is actuated from the warped cam 68 and is connected with an intermediate point of a second floating lever 92 whose lower point is controlled through a pin and slot connection by a cam 93 secured to the shaft 85. The upper end of lever 92 is connected with the ignition timing control lever 94 which angularly adjusts the electrical circuit breaker of the magneto 95 or other equivalent spark timing control device, and can be rotated clockwise to advance the spark or counter-clockwise to retard the spark.

A third power piston 97, actuated from cam 69, controls an intermediate point of lever 99 whose lower end is adjusted through a pin and slot connection by a cam 100 carried by the shaft 85. The upper end of lever 99 actuates a fuel-air mixture ratio control lever 101 which may be provided in connection with the engine fuel injection control system in case of an injection engine or, as shown in FIGURE 1, with the engine carburetor 102. Counter-clockwise rotation of lever 101 increases the fuel-air ratio.

The sealed bellows housings 61 and 62 are connected by means of conduits 103 and 104 with the engine induction manifold 105 and with the exhaust manifold 107, respectively. A conventional gear-driven supercharger may be provided in the engine 10, between the carburetor 102 and the manifold 105.

The lever 57 of the regulator is connected with a floating lever 110 whose upper and lower ends are actuated by a manifold or intake charge temperature responsive element 111, and by a cylinder temperature responsive element 112, respectively, whereby an increase of either temperature causes clockwise rotation of lever 57, as shown in FIGURE 1, and cams 67, 68 and 69.

A pilot's lever 65 is connected with the bell-crank lever 64 by a linkage which includes the rod elements 114, 115 and 116. The pivot between elements 114 and 115 is guided by a lever 118 rotatably mounted on the cover of housing 62; while the pivot between elements 115 and 116 is connected with one end of lever 120 whose opposite end is carried by the free extremity of a bimetallic strip 121 surrounded by a heating coil 122 and so designed as to deflect upward when heated. The coil is connected with a storage battery 123 and, through the conductor 124, with a contact included in the detonation detector 125 mounted on the head of one of the engine cylinders.

The detonation detector 125 is no part of the present invention, and the specific structure thereof is unnecessary for an understanding of the invention. A full description of the detonation detector 125 is found in said Patent 2,670,724. It need only be noted here that the detonation detector 125 includes an electric contact, one element of which is connected with the conductor 124, while the other element is connected to the ground through the engine cylinder, and that during normal engine operation the contact remains open, no current flows around the heating coil 122, the bimetallic strip 121 remains flat, and the linkage elements 115 and 116 are substantially coaxial. However, the arrangement is such that whenever detonation occurs, the contact elements are caused to engage and determine flow of current through the heating coil 122, whereupon the bi-metallic strip 121 bends upward and throws the linkage elements 115 and 116 out of line as shown in FIGURE 2. Thus, for a fixed adjustment of the manual lever 65, the occurrence of detonation determines clockwise rotation of the bell-crank lever 120 and axial displacement of the shaft 54.

It is therefore clear that owing to the axial and angular motions of the warped cams 67, 68 and 69 and to the rotation of cams 84, 93 and 100, the regulator 53 simultaneously regulates the cylinder compression ratio, the ignition timing and the fuel-air ratio as a predetermined function of the adjustment of the pilot's lever 65, the induction and exhaust pressures, the rate of cylinder pressure rise or intensity of detonation, the intake charge and cylinder temperatures, and the engine speed. The warped cams and the slots in the rotatable cams may be so designed as to obtain for each set of operating pressures, temperatures and speed predetermined optimum values of compression ratio, ignition timing and combustible mixture ratio. For example, where the operating pressures, temperatures and speed are those corresponding to normal cruising conditions, the regulator will maintain high compression ratio, large spark advance and lean mixture to insure optimum fuel economy. Upon increase of intake charge temperature and/or cylinder temperature, the ensuing rotation of the cams may decrease the compression ratio and/or retard the spark and increase the fuel-air ratio. If the engine power output is increased, the increase of engine speed, manifold pressure and operating temperatures cause rotation of the cams 84, 93 and 100 and axial and angular displacement of the warped cams 67, 68 and 69 to decrease the compression ratio, retard the spark and increase the fuel-air ratio. The lever 65 may be used to adjust the operative setting of the regulator in accordance with the octane rating or antidetonating characteristics of the fuel employed, and is supplemented by the detonation detector 125. Should detonation occur, the bending of the strip 121 would cause sliding motion of the cams in the same direction as if caused by increase of manifold pressure. Obviously, the reglulator may be designed for the automatic adjustment of compression ratio, spark advance and fuel-air ratio throughout the whole range of engine operating conditions, including starting and idling.

FIGURES 3 and 4 illustrate another example of embodiment of the invention. The aircraft engine 10' is provided with compression ratio, ignition timing and fuel-air ratio control levers 47, 94 and 101 respectively, as already set forth in detail, as well as with a variable pitch propeller, as diagrammatically indicated in FIGURE 5, whose pitch is regulated by a servo motor controlled by a pilot valve 141 actuated by an engine-driven governor including a spring 142. The load of this spring is adjusted by means of a lever 142' actuated from a manual lever 143 which serves to select the engine speed.

The regulator 53' is similar to the regulator 53 of FIGURES 1 and 2 except that it includes a fourth warped cam 144 actuating a power piston 145; and shaft 85' carries a fourth cam 146 and is linked by means of lever 87' to the engine speed control lever 143 and therefore is angularly adjusted in dependence upon the engine speed. In addition to the three floating levers 82, 92 and 99, a fourth lever 147 is provided, connected at its upper end with the power piston 145 and carrying a pin 146' engaging a slot formed in cam 146. The lower end of the lever 147 controls a servo-motor comprising a pilot valve 148 which is adapted to connect the space within a resilient bellows 149 either with a low pressure oil line 150 or with a high pressure oil line 151.

The engine throttle 152 may be controlled automatically through a boost control, or it may be actuated from a manual lever 153 as shown in FIGURE 3. The throttle valve 152 is actuated through a linkage including elements 154 and 155 whose common pivot point is connected with the free end of the servo-motor bellows 149 in such a manner that when this bellows is in contracted position as shown in FIGURE 3 the elements 154 and 155 are almost coaxial, while upon motion toward the left of the pilot valve 148 connecting the high pressure oil line 151 with the space within the bellows 149, the latter expands and the elements 154 and 155 are thrown out of alignment and cause the throttle valve 152 to rotate clockwise toward closed position. Thus, where the manual lever 153 is turned to its extreme counter-clockwise position (tending to turn the throttle valve 152 to wide open adjustment) the servo-motor 148—149 of the boost control will assume full control of the throttle valve 152, from wide open position (with the power bellows 149 fully contracted) to closed position (with the bellows fully extended). It will be clear, therefore, that where automatic control of the engine fuel supply and power output by the control boost is desired, the manual lever 153 will be kept in its extreme counter-clockwise adjustment, and the datum of the boost control may be varied at will by means of the lever 65 (FIGURE 2) so as to select any desired operating condition, in which case the manual lever 153 would only be resorted to in the event of failure of the boost control. Or, alternatively, the same device may be used for semi-automatic operation, simply by removing the lever 153 from its fully advanced (counter-clockwise) adjustment, and using the same lever 153 for direct manual operation of the throttle valve 152, in which case the boost control is confined to the role of a stand-by safety device which takes over control of the throttle valve automatically whenever certain preselected limits of manifold pressure or power output tend to be exceeded. Such limits may be varied by the pilot or operator by altering the datum of the boost control through the lever 65.

The device, as illustrated in FIGURE 3, is set for semi-automatic operation, with the lever 153 in intermediate adjustment so as to partly close the throttle valve. The manifold pressure thus obtained is lower than the value for which the boost control is set. Therefore, the pilot valve 148 is removed from its neutral position, and the power bellows 149 is inactive in its lowermost position. The pilot or operator may thus control the engine fuel supply directly by actuating the throttle valve from the manual lever 153 without any interference on the part of the boost control, so long as the power output of the engine is maintained within the limits for which he has set the lever 65. However, as soon as said limits are exceeded (as it may happen for instance where the throttle lever 153 is advanced too far, or the airplane descends to lower altitude), the increasing manifold pressure contracts the bellows 59 and determines movement of the pilot valve 148 to the opposite side of its neutral position so as to connect the power bellows 149 with the high pressure line 151, whereupon the bellows expands and closes the throttle valve 152 so as to decrease the engine fuel supply and maintain the engine power within the selected limits.

The engine 10' is further provided with a water injection device diagrammatically shown as forming part of the carburetor 102'. This device includes an admission pipe 157 connected with a source of pressure water or other suitable liquid or anti-detonating fluid, and a control member or valve 158 for regulating the admission of said water or fluid. The valve 158 is controlled by a lever 159 and is normally kept closed by a spring. A pin secured to lever 159 engages an elongated slot 160 formed at one end of a rod 161, the opposite end of which is connected to lever 99, thus providing a lost motion connection between the two levers. A calibrated orifice 162 is provided in the water conduit, together with a resilient bellows 163 enclosed in a housing and having one end secured thereto. The space within the bellows 163 and the chamber surrounding the same are connected with the upstream and downstream sides of orifice 162, respectively, whereby the differential pressure determined by the orifice when water is delivered to the engine causes the bellows to expand.

The free end of bellows 163 is connected with the lower end of a floating lever 164, the upper end of which is connected with an intermediate point of another floating lever 110'. The lower end of lever 110' is actuated by the manifold temperature responsive element 111, while the upper end thereof is actuated by an element 112' so arranged as to be responsive to changes of exhaust temperature as well as to changes of cylinder temperature. A median point of lever 164 is in turn connected with the lever 57 of the regulator. Another lever 165 is rotatably mounted on a pin carried by rod 161, and has its lower and upper ends connected with lever 101 and with the lower end of lever 164, respectively.

The regulator 53' operates as follows: When water is not supplied to the engine, the bellows 163 remains in contracted position as shown in FIGURE 3; and the levers 82, 92 and 99 control the compression ratio, the spark timing and the fuel-air ratio as functions of the adjustment of lever 65, the operation of the detonation detector 125, the manifold and exhaust pressures, the manifold, cylinder and exhaust temperatures and the engine speed.

When bellows 163 is in contracted position, the lever 101 is actuated by lever 99 through rod 161 and floating lever 165, the upper end of the last mentioned lever being substantially stationary. However, upon motion of rod 161 to the left of sufficient amplitude to take up the lost motion between pin and elongated slot 160, the lever 159 is caused to rotate counter-clockwise against the load of the tension spring, thereby lifting valve 158 and admitting water to the engine; whereupon bellows 163 expands and moves the lower end of lever 164 to the left. This motion has a twofold effect: on the one hand it causes counterclockwise rotation of lever 165 and clockwise rotation of lever 101, thereby decreasing the fuel-air ratio. On the other hand it determines counter-clockwise rotation of lever 57 and of the warped cams, supplemented by further rotation in the same direction caused by the drop of operating temperatures accompanying the water injection.

If the water supply is exhausted, the bellows 163 contracts and moves the lower end of lever 164 back to the right; whereupon the lever 101 rotates counter-clockwise to increase the fuel-air ratio, and lever 57 is turned clockwise. Owing to the rotation of lever 57 caused by bellows 163, not only the fuel-air ratio but also the compression ratio and the ignition timing may be caused automatically to vary as water is delivered to the engine cylinders. Obviously, the extent of expansion of the resilient bellows 163 and the effect thereof are dependent upon the amount of water injected.

The general configuration of the warped cam 144 is such that axial motion thereof as caused by increase of manifold pressure (upward motion as seen in FIGURE 4) and/or rotation thereof as determined by increase of engine operating temperatures (clockwise rotation of lever 57 in FIGURE 3) cause clockwise rotation of lever 147 about its pin 146' and displacement of valve 148 toward the left. Where the lever 153 is in intermediate position, as shown in FIGURE 3, that is, for manual operation of the throttle valve 152, the bellows 149 remains inactive until the valve 148 moves far enough to the left to connect the space within the bellows with the high pressure oil line 151. When this occurs, the bellows 149 expands, turns the throttle valve 152 clockwise and determines a decrease of boost or manifold pressure, thus causing bellows 59 to expand and shift cam 144 downward as seen in FIGURE 4. This motion of cam 144 causes displacement of valve 148 to the right, until the connection between the high pressure oil line 151 and the bellows 149 is interrupted, whereupon expansion of the latter ceases. It is thus apparent that the device of FIGURES 3 and 4 automatically limits the manifold pressure to a maximum value which is a function of the various parameters or variables upon which the adjustments of cam 144 and cam 146 are dependent. With a warped cam 144 having a general configuration set forth above said boost limit increases upon counter-clockwise rotation of the pilot's lever 65, decrease of exhaust pressure, and/or decrease of engine operating temperatures; and said boost limit decreases upon occurrence of detonation. Furthermore, for a given value of the engine operating temperatures the boost limit increases when water is supplied to the engine cylinders. The pilot's lever 65 may be so set as to select various automatic regulations of the boost limit, corresponding for example to take-off rating admissible only for a few minutes, or to cruising operation. Where, on the other hand, the lever 153 is in fully advanced (or extreme counter-clockwise) adjustment, the boost control operates not only to prevent certain operating conditions from exceeding selected values, but is effective at all times to control the fuel flow so as to obtain automatically the schedule or program of operating conditions as selected by means of the datum-varying lever 65.

These embodiments of the invention have been shown merely for purpose of illustration and not as a limitation of the scope of the invention. It is therefore to be expressly understood that the invention is not limited to the specific embodiments shown, but may be used in various other ways, and that various changes, substitutions, additions and omissions may be made in the construction, arrangement and manner of operation of the parts and elements within the scope or limits of the invention as defined in the following claims. Moreover, the invention may be used in connection with different types of engines, powerplants or prime movers. In particular, while the warped or three dimensional cams have been disclosed as slidable and rotatable, according to the invention they may have different orders of adjustment, for example they may be reversibly slidable in two different directions. Also, according to the invention, engine torque responsive means (such as a hydraulic torque-meter connected with a propeller reduction gear) may be substituted for the induction pressure responsive bellows 59.

Where the claims are directed to less than all of the elements of the complete system disclosed, they are intended to cover possible uses of the recited elements in installations which lack the non-recited elements.

I claim:

1. In a control system for an aircraft engine driving a variable-pitch propeller and having a combustion chamber and an air induction system leading to said combustion chamber, the combination with adjustable engine speed responsive means for varying the propeller pitch to control the engine speed of a pilot's control lever connected with said speed responsive means for adjusting the same to set the desired engine speed, a fuel regulating device including fuel control means movable in one direction to increase the engine fuel-air ratio and in the opposite direction to decrease said ratio, a first cam connected with the pilot's control lever and positioned thereby, a first cam follower positioned by the first cam, a second cam, a second cam follower positioned by the second cam, first temperature responsive means connected with said air induction system for positioning the second cam, means for operatively connecting said fuel control means with said first and second cam followers to adjust said fuel control means from said first and second cam followers whereby the engine fuel-air ratio may be caused to vary as a predetermined function of the induction air temperature and the setting of the pilot's control lever, and additional temperature responsive means for sensing an operating temperature of the engine resulting from combustion to alter the engine fuel-air ratio as a predetermined function of the last named temperature.

2. In a control system for an aircraft engine driving a variable-pitch propeller and having a combustion chamber and an air induction system leading to said combustion chamber, the combination with adjustable engine speed responsive means for varying the propeller pitch to control the engine speed, of a pilot's control lever connected with said speed responsive means for adjusting the same to set the desired engine speed, a fuel regulating device including fuel control means movable in one direction to increase the engine fuel-air ratio and in the opposite direction to decrease said ratio, first temperature responsive means for sensing the engine air induction temperature, an operative connection between said pilot's control lever, temperature responsive means and fuel control means for varying the fuel-air ratio as a predetermined function of the set engine speed and the induction air temperature, and second temperature responsive means sensing an engine temperature resulting from combustion for further varying the engine fuel-air ratio in predetermined relation to the last mentioned temperature.

3. In a control system for an aircraft engine driving a variable-pitch propeller and having a combustion chamber and an air induction system leading to said combustion chamber, the combination with adjustable engine speed responsive means for varying the propeller pitch to control the engine speed, of a pilot's control lever connected with said speed responsive means for adjusting the same to set the desired engine speed, a fuel regulating device including fuel control means movable in one direction to increase the engine fuel-air ratio and in the opposite direction to decrease said ratio, first temperature responsive means for sensing the engine air induction temperature, means for operatively connecting said fuel control means with the pilot's control lever and the first temperature responsive means to vary the fuel-air ratio as a predetermined function of the set engine speed and said induction temperature, second temperature responsive means for sensing an engine temperature resulting from combustion to vary the engine fuel-air ratio in predetermined relation to the last mentioned temperature, and additional pilot's control means for altering the effect of one at least of said temperature responsive means on the engine fuel-air ratio.

4. In an integrated speed and fuel control system for an aircraft engine driving a variable-pitch propeller and having an air induction system leading to a combustion chamber, the combination with adjustable engine speed responsive means for controlling the propeller pitch to regulate the engine speed, of a pilot's control lever for adjusting said speed responsive means to set the desired engine speed, fuel-air ratio control means movable in one direction to increase the engine fuel-air ratio and in the opposite direction to decrease the said ratio, first temperature responsive means for sensing the temperature in said air induction system, second temperature responsive means for sensing an engine operating temperature which varies with changes in the rate of fuel supply to the engine, and means for operatively connecting said fuel-air ratio control means with said pilot's control lever and said first and second temperature responsive means to vary the engine fuel-air ratio as a preselected functicon of the set engine speed, the induction air temperature and said engine operating temperature.

5. A control system as defined in claim 2 further including means responsive to a parameter of engine operation for varying the effect of one at least of said temperature responsive means on the said fuel-air ratio control means.

6. An integrated control system as defined in claim 4 further including regulating means subject to manual supervision for varying the effect of one at least of said temperature responsive means on the said fuel-air ratio control means.

References Cited in the file of this patent

UNITED STATES PATENTS

| 2,217,364 | Halford et al. | Oct. 8, 1940 |
| 2,303,998 | Holley | Dec. 1, 1942 |
| 2,670,724 | Reggio | Mar. 2, 1954 |

OTHER REFERENCES

Serial No. 281,826, Stieglitz et al. (A.P.C.), Published May 18, 1943.